United States Patent Office 3,401,214
Patented Sept. 10, 1968

3,401,214
N,N'-SULFONYL-BIS-(CARBAMOYL-PHOSPHONIC ACID ESTERS)
John J. Kohler, Branford, Conn., assignor to Olin Mathieson Chemical Corporation, New Haven, Conn., a corporation of Virginia
No Drawing. Filed Oct. 7, 1965, Ser. No. 493,882
8 Claims. (Cl. 260—932)

ABSTRACT OF THE DISCLOSURE

A series of N,N'-sulfonyl - bis - (carbamoylphosphonic acid esters) are provided by the reaction of sulfuryldiisocyanate with various disubstituted hydrogen phosphites. The esters are valuable fungicides, nematocides and herbicides.

---

This invention relates to a series of N,N'-sulfonyl-bis-(carbamoylphosphonic acid esters), and more specifically it relates to compounds having the following general formula:

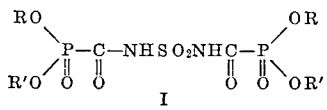

wherein R and R' each represents alkyl, substituted alkyl, aryl, substituted aryl, aralkyl or alkaryl.

In accordance with this invention, the esters I are provided in high purity by the reaction of sulfuryldiisocyanate and various disubstituted hydrogen phosphites. The reactions described herein are vigorously exothermic, and the ester products are obtained in high yield even after purification procedures. It is known that organic isocyanates, such as phenyl isocyanate and the like, react very slowly with similar disubstituted hydrogen phosphites in the absence of a basic catalyst, and these reactions require prolonged reaction periods at elevated temperatures to provide even low yields of carbamoylphosphonic acid ester products. Thus the uncatalyzed high reactivity of sulfuryldiisocyanate with the phosphites wherein the very high yields of the esters I are provided was an unexpected and surprising feature of this invention. The reactions described herein proceed in accordance with the following equation wherein R and R' are as previously represented:

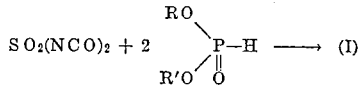

The process described herein for the preparation of N,N'-sulfonyl-bis-(carbamoylphosphonic acid esters) is a general one, and all of the aforementoned disubstituted hydrogen phosphites (R and R' being as defined before) may be utilized in the process. However preferred embodiments of the esters are those compounds I where R and R' are alkyl having 1–8 carbon atoms, phenyl, benzyl, chlorophenyl, nitrophenyl and alkaryl having 7–10 carbon atoms. Thus included among the suitable disubstituted hydrogen phosphites which may be reacted with sulfuryldiisocyanate to provide these preferred derivatives are: dimethyl phosphite, diethyl phosphite, dipropyl phosphite, diisopropyl phosphite, dibutyl phosphite, diisobutyl phosphite, diisoamyl phosphite, diisooctyl phosphite, and mixtures thereof such as methylethyl phosphite; diphenyl phosphite, dibenzyl phosphite, di(p-chlorophenyl) phosphite, di(p-nitrophenyl) phosphite, di(m-tolyl) phosphite, di(p-tolyl) phosphite and di(tert.-butylphenyl) phosphite.

As mentioned in the preceding discussion, the reaction of the sulfuryldiisocyanate and the phosphites is accompanied by evolution of heat. The use of an external cooling system may be employed in order to control the exothermic reaction, or reactant addition may be slowed to achieve the same result. The liquid diisocyanate and the liquid disubstituted hydrogen phosphites can be reacted together by contacting them at a temperature range of about −20° C. to about 150° C. to provide the desired derivatives I. However it is preferable to employ an inert diluent in the preparation of the ester products. Suitable inert organic diluents which may be employed in the practice of this invention include benzene, toluene, xylenes, diethyl ether and similar ethers, acetonitrile and aliphatic hydrocarbons such as hexane. Whether or not diluents are employed, a preferred reaction temperature range of 0° C. to 40° C. is advantageously utilized, and as mentioned previously external cooling means can be employed to control the exotherm within this range. The solid or oily ester products can be conveniently isolated by conventional techniques such as filtration, centrifugation or extraction procedures.

The esters I of this invention are valuable agricultural chemicals. They are useful foliar fungicides, and they are particularly effective in controlling the powdery mildew, a disease pathogenic to cucumber plants. They are also effective as nematocides in controlling root-knot nematodes which are obligate plant parasites especially damaging to tomato and cucumber plants. Several of the esters of this invention are also effective herbicides against a variety of broadleaf and grassy weeds when applied as a post-emergence treatment.

The following examples will serve to illustrate the preparation of several of the esters included in the general Formula I.

EXAMPLE 1

A 500 ml. three-necked flask equipped with a magnetic stirrer, addition funnel, reflux condenser and a CaSO$_4$ drying tube was charged with 14.8 g. (0.1 mole) of sulfuryldiisocyanate and 150 ml. of dry diethyl ether and then cooled to 0° C. A solution of 22.0 g. (0.2 mole) of dimethylphosphite in 100 ml. of dry diethyl ether was added to the slowly stirred solution in the flask over a period of one hour while the reaction temperature was maintained at 0°–10° C. by means of an ice bath. The system become turbid as the addition proceeded and an oil separated. After standing for 12 hours at room temperature, the oil partially solidified. The mixture of oil and solid was isolated by decantation of the supernatant liquid and after drying over phosphorus pentoxide was converted completely to a white solid. The crude material was recrystallized from acetone to give a white, crystalline solid with a melting point of 128°–130° C. The following analytical data revealed that N,N'-sulfonyl-bis-[carbamoylphosphonic acid, dimethyl ester] had been obtained. Yield: 68%.

*Analysis.*—Calcd. for $C_6H_{14}N_2O_{10}P_2S$: C, 19.57; H, 3.83; N, 7.61; P, 16.81; S, 8.71. Found: C, 19.98; H, 3.91; N, 7.53; P, 16.95; S, 8.25.

EXAMPLE 2

In the manner of Example 1, 27.6 g. (0.2 mole) of diethylphosphite in 125 ml. of dry diethyl ether was reacted with 14.8 g. (0.1 mole) of sulfuryldiisocyanate in 250 ml. of dry diethyl ether. No product appeared initially but after standing for 18 hours at room temperature, a white solid separated from the solution. It was recrystallized from isopropanol to give transparent needles which upon heating became opaque at 121° C. and melted sharply at 124° C. The following analytical data revealed that N,N'-sulfonyl-bis-[carbamoylphosphonic acid, diethyl ester] had been obtained. Yield 67%.

*Analysis.*—Calcd. for $C_{10}H_{22}N_2O_{10}P_2S$: C, 28.31; H, 5.22; N, 6.60; P, 14.58; S, 7.55. Found: C, 28.34; H, 5.40; N, 6.73; P, 14.60; S, 7.64.

EXAMPLE 3

In the manner of Example 1, 33.2 g. (0.2 mole) of diisopropylphosphite in 125 ml. of dry diethyl ether was reacted with 14.8 g. (0.1 mole) of sulfuryldiisocyanate in 250 ml. of dry diethyl ether. After standing for 18 hours at room temperature, a white solid separated from the solution. The crude product was recrystallized from ethanol as colorless crystals with melting point of 136° C. The following analytical data revealed that N,N'-sulfonyl-bis-[carbamolyphosphonic acid, diisopropyl ester] had been obtained. Yield: 61%.

*Analysis.*—Calcd. for $C_{14}H_{30}N_2O_{10}P_2S$: C, 35.00; H, 6.29; N, 5.83; P, 12.68; S, 6.67. Found: C, 35.12; H, 6.16; N, 5.73; P, 12.60; S, 6.53.

EXAMPLE 4

In the manner of Example 1, 38.8 g. (0.2 mole) of dibutylphosphite in 75 ml. of dry diethyl ether was reacted with 14.8 g. (0.1 mole) of sulfuryldiisocyanate in 50 ml. of dry diethyl ether. The system was stirred for 20 hours at room temperature but no product separated from the solution. The solvent and other volatiles were removed under reduced pressure to give as residue a viscous oil with a very faint yellow tint. After drying the oil over phosphorus pentoxide, the following analytical data revealed that N,N'-sulfonyl-bis-[carbamoylphosphonic acid, dibutyl ester] had been obtained. Yield 95%.

*Analysis.*—Calcd. for $C_{18}H_{38}N_2O_{10}P_2S$: C, 40.29; H, 7.09; N, 5.22; P, 11.55; S, 5.97. Found: C, 40.28; H, 7.09; N, 5.53; P, 11.44; S, 6.17.

EXAMPLE 5

A 500 ml. three-necked flask equipped with a magnetic stirrer, addition funnel, reflux condenser and a $CaSO_4$ drying tube was charged with a solution of 14.8 g. (0.1 mole) of sulfuryldiisocyanate and 125 ml. of dry diethyl ether. A solution of 46.7 g. (0.2 mole) of diphenyl phosphite in 70 ml. of dry diethyl ether was added over a period of 45 minutes at room temperature. The system became warm during the addition, turbid after approximately half of the phosphite had been added, and slowly began to precipitate a white solid after the addition was complete. The solid was isolated by filtration and after vacuum drying had a melting point of 125°–127° C. The following analytical data revealed that N,N'-sulfonyl-bis-[carbamoylphosphonic acid, diphenyl ester] had been obtained.

*Analysis.*—Calcd. for $C_{26}H_{22}N_2O_{10}P_2S$: C, 50.66; H, 3.59; N, 4.54; P, 10.03; S, 5.20. Found: C, 50.47; H, 3.78; N, 4.73; P, 9.98; S, 5.05.

EXAMPLE 6

A 250 ml. Erlenmeyer flask equipped with a magnetic stirrer, addition funnel and $CaSO_4$ drying tube was charged with 26.2 g. (0.1 mole) of dibenzylphosphite and 75 ml. of diethyl ether and cooled to 0° C. in an ice bath. A solution of 7.4 g. (0.05 mole) of sulfuryldiisocyanate in 25 ml. of dry diethyl ether was added over a period of 40 minutes. A clear, colorless oil separated during the addition. The oil was isolated by decantation of the supernatant liquid, washed with fresh, dry diethyl ether and dried over phosphorus pentoxide. The infrared spectrum of the oil revealed that N,N'-sulfonyl-bis-[carbamoylphosphonic acid, dibenzyl ester] had been obtained. The oil exhibited some instability inasmuch as it changed to a dark red mass on standing at room temperature.

What is claimed is:

1. N,N'-sulfonyl-bis-(cabamoylphoshonic acid esters) having the formula

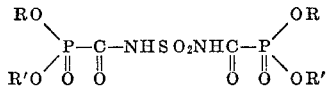

wherein R and R' are each independently selected from the class consisting of alkyl having 1–8 carbon atoms, phenyl, chlorophenyl, nitrophenyl, benzyl and alkaryl having 7–10 carbon atoms.

2. N,N'-sulfonyl - bis - [carbamoylphosphonic acid, diphenyl ester].

3. N,N'-sulfonyl-bis-[carbamoylphosphonic acid, dibenzyl ester].

4. The compounds of claim 1 wherein R and R' represent alkyl having 1–8 carbon atoms.

5. N,N'-sulfonyl-bis-[carbamoylphosphonic acid, dimethyl ester].

6. N,N'-sulfonyl-bis-[carbamoylphosphonic acid, diethyl ester].

7. N,N'-sulfonyl-bis-[carbamolyphosphonic acid, diisopropyl ester].

8. N,N'-sulfonyl-bis-[carbamoylphosphonic acid, dibutyl ester].

References Cited

UNITED STATES PATENTS 2,909,558   10/1959   Reetz ---------- 260—970 XR

CHARLES B. PARKER, *Primary Examiner.*

A. H. SUTTO, *Assistant Examiner.*